United States Patent [19]

Brosius et al.

[11] Patent Number: 4,966,798

[45] Date of Patent: Oct. 30, 1990

[54] OPTICAL RECORDING MEDIUM

[75] Inventors: Sibylle Brosius, Mannheim; Helmut Barzynski, Bad Durkheim; Karl-Heinz Feuerherd, Hettenleidelheim; Wolfgang Schrott, Ludwigshafen; Bernhard Albert, Maxdorf; Michael Acker, Heidelberg; Klaus D. Schomann, Ludwigshafen; Harald Kuppelmaier, Heidelberg; Michael Schmitt, Ludwigshafen, all of Fed. Rep. of Germany

[73] Assignee: BASF Aktiengesellschaft, Ludwigshafen, Fed. Rep. of Germany

[21] Appl. No.: 363,962

[22] Filed: Jun. 9, 1989

[30] Foreign Application Priority Data

Jun. 11, 1988 [DE] Fed. Rep. of Germany ...... 3820001

[51] Int. Cl.$^5$ .................................................. B32B 3/02
[52] U.S. Cl. ........................................ 428/64; 428/65; 428/913; 369/288; 346/76 L; 346/135.1; 430/270; 430/945
[58] Field of Search .......................... 428/64, 65, 913; 369/288; 346/76 L, 135.1; 430/945, 270

[56] References Cited

U.S. PATENT DOCUMENTS

| 3,637,581 | 1/1972 | Horiguchi et al. |
| 4,097,895 | 6/1978 | Spong. |
| 4,380,769 | 4/1983 | Thomas et al. |
| 4,666,819 | 5/1987 | Elmasry ............................ 430/270 |
| 4,702,945 | 10/1987 | Etzbach et al. |
| 4,739,029 | 4/1988 | Elmasry ............................ 528/373 |

FOREIGN PATENT DOCUMENTS

| 0155780 | 9/1985 | European Pat. Off. |
| 0186404 | 7/1986 | European Pat. Off. |
| 0191215 | 8/1986 | European Pat. Off. |
| 0200833 | 11/1986 | European Pat. Off. |
| 0204876 | 12/1986 | European Pat. Off. |
| 0213923 | 3/1987 | European Pat. Off. |

OTHER PUBLICATIONS

Metal 1,2-Dithiolene and Related Complexes, J. A. McCleverty Progr. Inorg. Chem. 10, (1968, pp. 49-221.
G. N. Schrauzer, Acc. Chem. Res. 2 (1969), pp. 72-80.
Kuroiwa, Jap. J. Appl. Phys, vol. 22, No. 2 (1983), pp. 340-343.

*Primary Examiner*—Patrick Ryan
*Attorney, Agent, or Firm*—Keil & Weinkauf

[57] ABSTRACT

An optical recording medium comprises a support material and a light-absorbing layer consisting essentially of a soluble mixture of a thermoplastic binder and at least one dye, wherein the thermoplastic binder is a phenol-aldehyde resin having an average molecular weight of greater than 300 which is soluble in an alcohol having a boiling point of less than 200° C.

2 Claims, No Drawings

OPTICAL RECORDING MEDIUM

The present invention relates to an optical recording medium comprising a support material and a light-absorbing layer consisting essentially of a soluble mixture of a thermoplastic binder and one or more dyes.

Recording media where information is stored by localized changes in the optical properties of the medium are known. In these recording media, a thermally initiated change of state of the recording parts of the recording material is brought about by radiation of high energy density, for example laser light. These changes can take the form of limited vaporization of material, shape or surface change of the recording layer due to softening, discoloring or fading of a dye or else a change in the physical structure of the material as long as these processes bring about a change in the optical properties, for example the absorption or extinction, of the recording material and are subsequently redetectable with suitable means and processible as stored information.

Existing optical recording media consist of a support material of glass or a suitable plastic, for example polycarbonate, with thin layers of inorganic material, for example metals, semimetals or alloys, or organic compounds, for example dyes, on top. These thin layers are predominantly produced by vacuum vapor deposition or by sputtering. In applying these layers, however, the thickness of the layer must be made such that the reflection becomes maximal.

For operation in conjunction with the predominant solid state injection lasers which emit in the near infrared, the organic dyes described are in particular phthalocyanine compounds, methine dyes and squaric acid derivatives. Azo dye complexes, anthraquinone and triphenylmethane dyes and also pyrylium and thiopyrylium salts have likewise been described, but they are only of limited use since their absorption maximum is in most cases at too short a wavelength for existing semiconductor lasers. This problem does not exist with the dithiolene complexes, of which a large number are known (for example J. A. McCleverty, Progr. Inorg. Chem. 10 (1968), 49–221; G. N. Schrauzer, Acc. Chem. Res. 2 (1969), 72–80) and the use of which in optical recording media has been described.

U.S. Pat. No. 4,097,895 describes a recording medium comprising a layer of a light-reflecting material, for example aluminum or gold, and a light-absorbing layer, for example fluorescein. This recording medium is operable with the radiation from an argon laser. The thickness of the light-absorbing layer is chosen to be such that the structure shoWs minimum reflectance. An incident light beam removes the absorbing layer by evaporating or melting it, leaving a hole through which the lightreflecting layer is laid bare. After a recording there is a difference for the wavelength of the light used for the recording between the minimum reflectance of the lightabsorbing layer and the higher reflectance of the lightreflecting layer. If the light-reflecting material takes the form of a thin layer on top of an only moderately heat-conducting substrate, the energy loss is very small not only because of minimum reflection at the thin absorbing layer but also because of the low heat conductance in the reflecting layer. The energy absorbed from the light beam is thus concentrated on the very thin film.

It is true in general, however, that the application of light-absorbing dye layers by vacuum vapor deposition or by sputtering is not only resource intensive but also difficult to make reproducible, since the dye must be present in a smooth layer of high optical quality in a thickness sufficient for the sensitivity of the recording medium and, what is more, such dye layers are mechanically too soft and also tend to crystallize.

To improve the layer quality and to increase the sensitivity, or reduce the noise, it has also been proposed to apply the light-absorbing dye in a layerforming polymeric binder. US-A-4,380,769 discloses argon laser writable recording media where the light-absorbing layer comprises azo dyes and/or coumarin compounds in a polymeric binder. The use of dyes in conjunction with styrene oligomers is described by Kuroiwa in Jap. J. Appl. Phys., Vol. 22, No. 2 (1983), 340–43. In this reference, attention is also drawn to the difficulties with such a combination of substances in light-absorbing layers due to phase separation and incompatibility between dye and oligomer. In addition, US-A-3,637,581 and EP-A-200,833 inter alia point out the possibility of remedying the aforementioned disadvantages by means of a chemical bond between the chromophore and the polymer. However, for many applications such a measure is unsuitable, since only a small selection of dyes is suitable for this purpose which, what is more, do not result in any good light-absorbing layers.

In summary it can be stated that the use of specific dyes, particularly suitable because of their excellent absorption characteristics, for the storage layers of optical recording media presents problems in particular in relation to the application of optically uniform and stable layers. It is necessary to mention here in particular the crystallization in pure dye layers and in insufficiently compatible dye/binder layers. Even the addition of these dyes to layer-forming polymers presents problems because of the limited solubility of the components and due to phase separation with time. Also, it is customary to apply the light-absorbing layer to the supports, usually made of polycarbonate, by spin coating, so that alcohols are obvious solvents. However, most of the film formers widely used for this purpose are insoluble in alcohols. The IR dyes preferred for optical recording, in particular, are not sufficiently compatible in the customary film formers.

It is an object of the present invention to provide optical recording media whose light-absorbing layer consists of a soluble mixture of a dye and a polymer, said polymer permitting improved solubility of the dyes and the formation of thicker layers and suppressing crystallization.

We have found that this object is achieved by optical recording media comprising a support material and a light-absorbing layer which consists essentially of a soluble mixture of a thermoplastic binder at least one dye if the thermoplastic binder is a phenol-aldehyde resin having a molecular weight of greater than 300 which is soluble in alcohols having a boiling point of less than 200° C.

These resins, which are also referred to as novolaks, produce particularly advantageous optical recording media, since they are notable for particularly good compatibility with dyes. These light-absorbing layers are appliable by the technically easily handleable spin coating process in sufficient thickness to obtain a good signal-to-noise ratio. The desired layer thicknesses within the range from 50 to 200 nm, preferably from 80 to 120 nm, are surprisingly easily obtainable by using the specific phenol-aldehyde resin for the optical recording media according to the invention. The crystallization is suppressible with binders.

The phenol-aldehyde resins which are soluble in alcohols having a boiling point of less than 200° C. and which are suitable for the optical recording media according to the invention are obtained by reacting polyfunctional phenols with an aldehyde. They are prepared by heating the polyfunctional phenol together with the aldehyde in a solvent in the presence of a catalyst, preferably under inert gas. By employing a less than stoichiometric amount of the aldehyde compared with the polyfunctional phenol in the presence of an acid catalyst an average molecular weight of greater than 300, preferably from 600 to 2000, is obtained. On the other hand, it is also possible to employ a small excess of the aldehyde compared with the polyfunctional phenol under decidedly acid conditions to obtain an average molecular weight of greater than 300, preferably from 2000 to 10,000.

Suitable polyfunctional phenols are phenol itself and compounds of the formulae

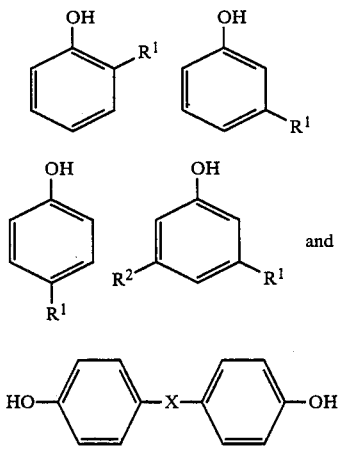

alone or mixtures thereof with $R^1$ and $R^2$ being independently of each other alkyl of from 1 to 10 carbon atoms, phenyl, halogen or hydroxyl and X being $-CH_2-$, $-C(C_3)_2-$ or $-O-$.

The aldehydes used are preferably formaldehyde or formaldehyde-eliminating compounds, but also acetaldehyde, chlorinated acetaldehydes and also acetals and hemiacetals.

The molar ratio of the components is in general from 0.80 to 1.2 aldehyde, based on polyfunctional phenol, in the presence of an acid catalyst.

The reaction is customarily carried out in the presence of solvents, such as ethers, alcohols and esters, which are chosen in such a way as to make it possible to use a reaction temperature of from 60 to 120° C.

This phenol-aldehyde resin which characterizes the optical recording medium according to the invention makes it possible to prepare a soluble mixture with a dye to form the light-absorbing layer.

Suitable dyes for the light-absorbing layer are the IR dyes known per se. These are predominantly the classes of azulenesquaric acid dyes as described in DE-A-3,733,173, the cyanine dyes described in DE-A-3,533,772, —3,608,214, —3,738,911 and —3,810,642, the phthalocyanine and naphthalocyanine dyes described for example in DE-A-3,446,418 and —3,520,109, EP-A155,780, —186,404, —191,215, —204,876 and —213,923, the dithiolene dyes described in DE-A-3,505,751, the naphthoquinone and anthraquinone dyes, the quinone dyes described in DE-A-3,507,379, the azo dyes as described in US-A-4,702,945, N,N,N',N'-tetratris(p-dialkylaminophenyl)-p-phenylenediamines, porphyrines and azo complex dyes.

Particularly preferred dyes in connection with the optical recording medium according to the invention are azulenesquaric acid dyes as described inter alia in DE-A-3,631,843, -3,733,173 and -3,810,642 and silicon naphthalocyanines.

To prepare the optical recording medium according to the invention, a dye solution is made up to contain a solids:solvent ratio of from 0.50 : 99.5 to 6 : 94 parts, preferably from 2 : 98 to 4 : 96 parts. Dust and other undissolved constituents are separated off in a conventional manner, for example by centrifugation or filtration. The solution is applied to a disk with a commercial laboratory coater (for example from Convac), the layer thickness being adjustable by the composition of the solution and the speed of rotation of the disk. The layer thickness is determinable with an α-step meter (for example the α-step meter 200 from Tencor) by sensing in the layer on a hard substrate, preferably glass, the depth of a score by means of a fine needle. The homogeneity is checked under a light microscope (for example at 500-fold or 1000-fold enlargement). The optical properties of the layer are measured with a UV-VIS spectrometer (for example Lambda 5 from Perkin Elmer).

A further advantage in the formation of the light-absorbing layer with the specific phenol-aldehyde resin results from the possibility of condensing the otherwise separately added antioxidants and UV stabilizers directly into the binder. Examples here are p-tert.-butylphenol and 2,4-dihydroxybenzophenone.

The novel optical recording media prepared in this manner are notable for the high stability of the light-absorbing layer, low sensitivity to oxygen, high reflectivity and low background noise.

The invention is illustrated in more detail by the Examples in comparison with the prior art (parts are by weight).

COMPARATIVE EXAMPLE 1

A dye solution is prepared from 4 parts of dye as described in Example 6 of DE-A-3,733,173 and 96 parts of n-propanol. The solution is filtered to remove dust and then applied by spin coating using a commercial laboratory coater. Speeds of from 700 to 4000 rpm give layers which on measurement with an α-step meter are found to be thinner than 100 nm.

EXAMPLE 1

A dye solution is prepared from 3.4 parts of dye as described in Example 6 of DE-A-3,733,173, 0.6 part of novolak and 96 parts of n-propanol, the said novolak having been prepared by reaction of formaldehyde and a phenol component consisting of 30 parts of phenol and 70 parts of a mixture of meta- and para-cresol. This novolak has an average molecular weight of 6300 (determined by GPC in THF against polystyrene as standard) and has a softening temperature of 117.8° C. (according to German Standard Specification DIN 52011). After filtration to remove dust the solution is applied by spin coating as described in Comparative Example 1. Layer thicknesses of 100 nm are obtained.

COMPARATIVE EXAMPLE 2

A dye solution is prepared from 1.17 parts of dye as described in Example 7 of DE-A-3,631,843, 0.13 part of polystyrene KR 2602 and 98.7 parts of toluene. After filtration to remove dust the solution is applied by spin coating as described in Comparative Example 1. The microscope reveals crystallites and a background structure, the latter indicating separation.

EXAMPLE 2

A dye solution is prepared from 0.80 part of dye as described in Example 7 of DE-A-3,631,843, 1.2 parts of novolak and 98 parts of diacetone alcohol, said novolak having been prepared by reacting formaldehyde with phenol. This novolak has an average molecular weight of 10,000 (determined by GPC in THF against polystyrene as standard) and has a softening temperature of 133.4° C (according to German Standard Specification DIN 52011). After filtration to remove any dust the solution is applied by spin coating as described in Comparative Example 1. Under the microscope, there is no sign of crystallites or background structures.

COMPARATIVE EXAMPLE 3

A dye solution is prepared from 3 parts of the dye as described in Example 8 of DE-A-3,810,642 and 97 parts of n-propanol. After filtration to remove any dust the solution is applied by spin coating as described in Comparative Example 1. Only 2 hours later the microscope reveals distinct signs of crystallization in the layer.

EXAMPLE 3

A dye solution is prepared from 1.5 parts of the dye as described in Example 8 of DE-A-3,810,642, 1.5 parts of novolak as described in Example 2 and 97 parts of n-propanol. After filtration to remove any dust the solution is applied as described in Comparative Example 1. The layer does not show any crystallization even days later.

We claim:

1. An optical recording medium comprising a support material and a light-absorbing layer having a thickness of from 50 to 200 nm consisting essentially of a soluble mixture of a thermoplastic binder and at least one IR dye, wherein the thermoplastic binder is a phenol-aldehyde resin having an average molecular weight of greater than 300 and up to 10,000 which is soluble in an alcohol having a boiling point of less than 200° C.

2. An optical recording medium as defined in claim 1, wherein the thermoplastic binder is composed of at least one compound having the formula

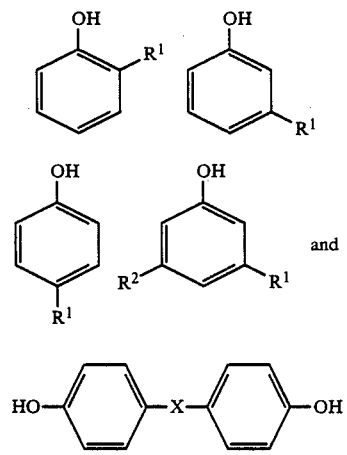

with $R^1$ and $R^2$ being independently of each other alkyl, halogen or hydroxyl and X being —$CH_2$—, —$C(CH_3)_2$— or —O—, and an aldehyde selected from the group consisting of formaldehyde, formaldehyde-eliminating compounds, acetaldehyde, chlorinated acetaldehydes, acetals and hemiacetals, and has an average molecular weight of from 600 to 10,000.

* * * * *